United States Patent
Dittrich

(10) Patent No.: US 7,896,294 B2
(45) Date of Patent: Mar. 1, 2011

(54) COVER SKIN FOR A VARIABLE-SHAPE AERODYNAMIC AREA

(75) Inventor: Kay W. Dittrich, Hoehenkirchen (DE)

(73) Assignee: Airbus Deutschland GmbH, Hamburg (DE)

( * ) Notice: Subject to any disclaimer, the term of this patent is extended or adjusted under 35 U.S.C. 154(b) by 454 days.

(21) Appl. No.: 11/286,834

(22) Filed: Nov. 23, 2005

(65) Prior Publication Data

US 2006/0163431 A1  Jul. 27, 2006

(30) Foreign Application Priority Data

Nov. 24, 2004  (DE) .................... 10 2004 056 649

(51) Int. Cl.
*B64C 3/44* (2006.01)
(52) U.S. Cl. ........... 244/219; 244/201; 244/46; 244/99.8
(58) Field of Classification Search ............... 244/46, 244/99.8, 123.3, 125, 126, 201, 219
See application file for complete search history.

(56) References Cited

U.S. PATENT DOCUMENTS

| | | | | |
|---|---|---|---|---|
| 2,463,010 | A * | 3/1949 | Almen | 29/424 |
| 2,973,170 | A | 2/1961 | Rodman | |
| 3,026,772 | A * | 3/1962 | Moreland | 89/1.51 |
| 3,450,374 | A * | 6/1969 | Moore | 244/5 |
| 4,038,040 | A * | 7/1977 | Nagl | 428/596 |
| 5,810,291 | A * | 9/1998 | Geiger et al. | 244/133 |
| 5,931,422 | A * | 8/1999 | Geiger et al. | 244/214 |
| 5,958,803 | A * | 9/1999 | Geiger | 442/71 |
| 6,027,074 | A * | 2/2000 | Cameron et al. | 244/133 |
| 6,145,791 | A * | 11/2000 | Diller et al. | 244/215 |
| 6,168,379 | B1 * | 1/2001 | Bauer | 416/23 |
| 6,337,294 | B1 * | 1/2002 | Waldrop, III | 442/71 |
| 6,575,407 | B2 * | 6/2003 | McCallum et al. | 244/133 |
| 6,588,709 | B1 * | 7/2003 | Dunne et al. | 244/201 |
| 6,644,599 | B2 | 11/2003 | Perez | |
| 6,722,611 | B1 * | 4/2004 | Wu et al. | 244/126 |
| 7,055,782 | B2 * | 6/2006 | Dittrich | 244/219 |
| 7,192,634 | B2 * | 3/2007 | Carter et al. | 428/113 |

(Continued)

FOREIGN PATENT DOCUMENTS

DE  2447565  4/1976

(Continued)

OTHER PUBLICATIONS

McGuire, Nancy K., "Composites of Opposites", Today's Chemist at Work, Nov. 2002. http://siler.neep.wisc.edu/~lakes/PoissonACS.pdf.*

(Continued)

*Primary Examiner* — Timothy D Collins
*Assistant Examiner* — Philip J Bonzell
(74) *Attorney, Agent, or Firm* — Christopher Paradies; Fowler White Boggs P.A.

(57) ABSTRACT

A cover skin for a variable-shape aerodynamic area, such as a wing structure, tail unit structure, control surface structure or flap structure is described. A cover skin is deformable in one direction without exhibiting substantial deformation in a transverse direction. A deformable framework structure is embedded in a layer of an elastic material, such as rubber or polymer. The framework structure may be comprised of non-deformable elements joined pivotably in auxetic and non-auxetic assemblies of elements that are capable of substantially eliminating transversal contraction, when the cover skin is longitudinal stretched, and substantially eliminating transversal expansion, when the cover skin is longitudinally contracted.

26 Claims, 4 Drawing Sheets

U.S. PATENT DOCUMENTS

| | | | |
|---|---|---|---|
| 2004/0069907 A1* | 4/2004 | Dockter et al. | 244/218 |
| 2005/0029406 A1* | 2/2005 | Dittrich | 244/221 |
| 2005/0151015 A1* | 7/2005 | Cagle et al. | 244/123 |
| 2006/0129227 A1* | 6/2006 | Hengelmolen | 623/1.16 |

FOREIGN PATENT DOCUMENTS

| | | |
|---|---|---|
| DE | 100 55 961 A1 | 5/2002 |

OTHER PUBLICATIONS

Bartlett, N., "Smart wings eliminate mechanical linkages", *Design Engineering*, Jul./Aug. 1995, pp. 43-44.

* cited by examiner

Fig. 7a)
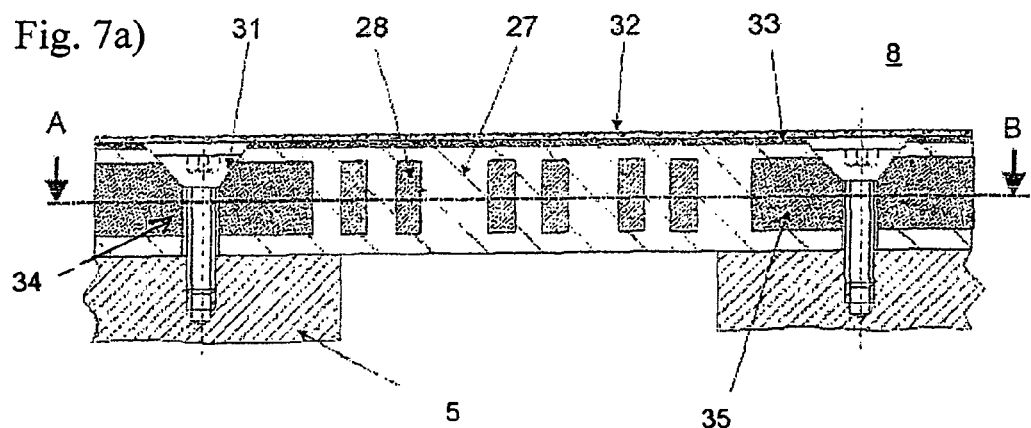
Section A-B
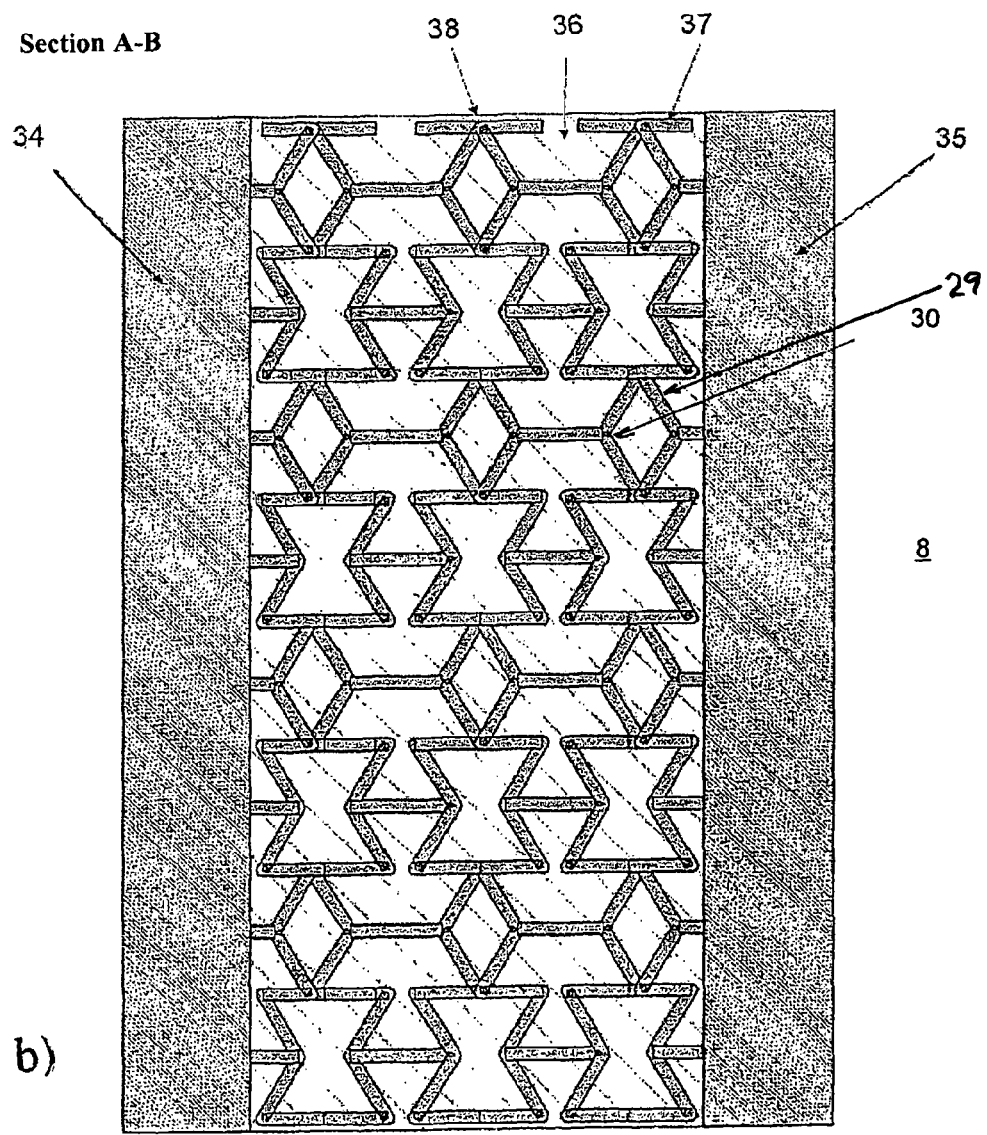
Fig. 7 b)

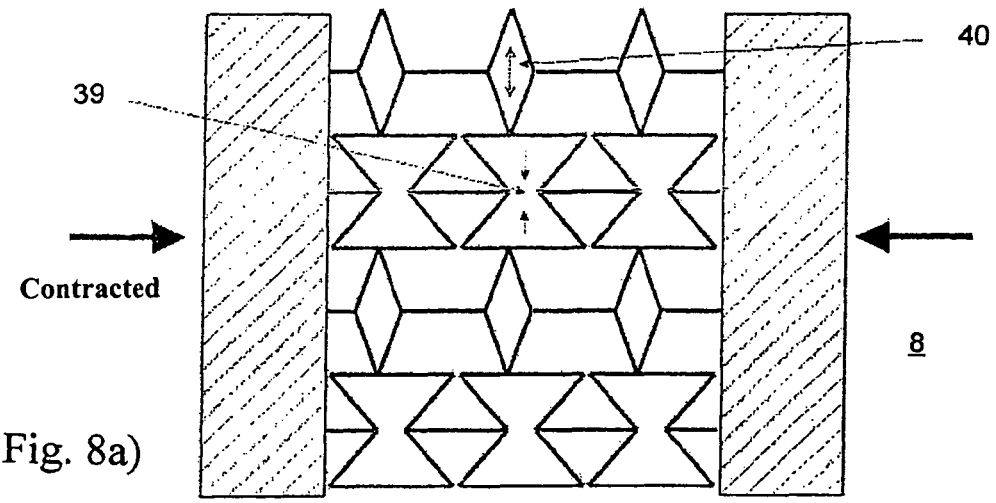
Fig. 8a) Contracted
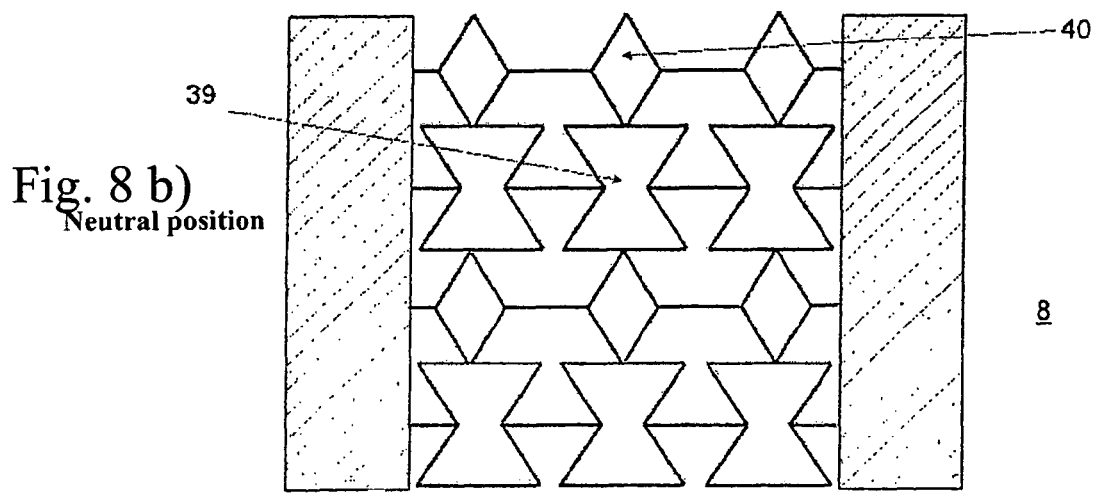
Fig. 8 b) Neutral position
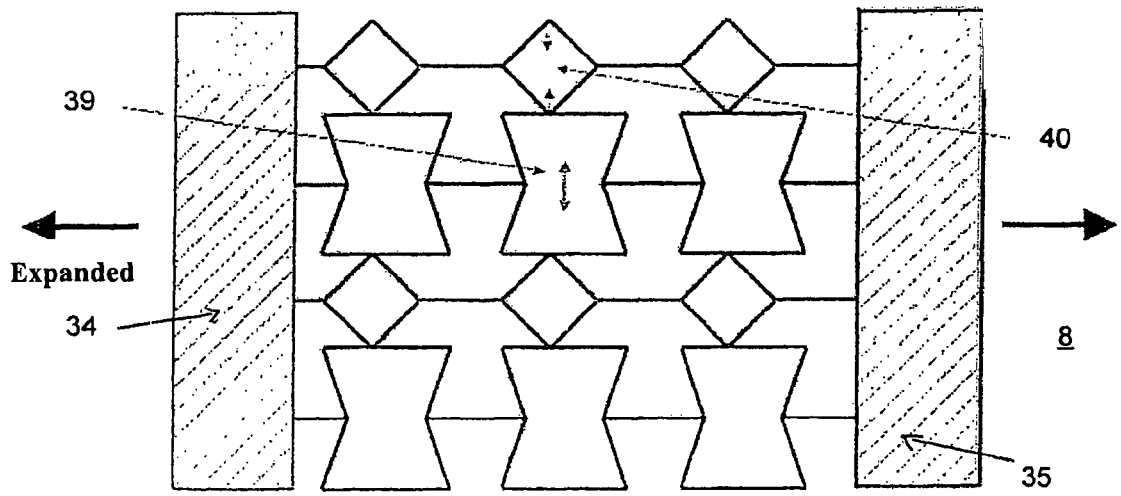
Fig. 8 c) Expanded

COVER SKIN FOR A VARIABLE-SHAPE AERODYNAMIC AREA

RELATED APPLICATIONS

This application claims the benefit of the filing date of German Patent Application No. 10 2004 056 649.6 filed Nov. 24, 2004, the disclosure of which is hereby incorporated herein by reference.

FIELD OF THE INVENTION

The field relates to a variable-shaped aerodynamic areas, such as a wing structure, tail unit structure, control surface structure or flap structure.

TECHNOLOGICAL BACKGROUND

In order to improve the aerodynamics of wings, tail units, control surfaces or flaps of aircraft and other flight equipment, increasingly so-called variable-shape wings are used. The aim is to change the profile curvature without there being any discontinuities such as flap gaps or kinks in the wing contour. One example of such a variable-shape wing structure is described in DE 100 55 961 A1 "Mechanismus zur zumindest bereichsweisen Verstellung der Wölbung von Tragflügeln". A further example is provided by the test program "Advanced Fighter Technology Integration (AFTI)/F-11 Mission Adaptive Wing (MAW)" implemented in the USA. In this test program an aircraft was equipped with a variable-shape wing and was tested in flight.

Many such variable-shape wing concepts are associated with a common problem of finding a cover skin for the variable-shape wing, which cover skin may not only tolerate the deformations resulting from the variability in shape, but may also withstand the air loads that occur.

Within the context of the above-mentioned "Mission-Adaptive Wing" program, this problem was solved in that the top of the aerodynamic profile comprises a layer made of glass fiber reinforced polymer, and is elastically bent, while the bottom comprises several overlapping metal sheets which may slide one on top of the other during deformation of the wing. A further approach was presented in the lecture entitled "Formveränderung von Flügelstrukturen mittels integrierter Shape Memory Alloy Aktuatoren" within the context of the 1994 annual conference of the DGLR, where fiber reinforcement with an extremely anisotropic layer construction in an elastic matrix was discussed. Another approach was proposed by Boeing. Their "Flex Skin" concept comprises short straight strips of carbon fiber-reinforced polymer, where strips are embedded in an elastic matrix such as they are insulated from each other. This hybrid structure may be bent, but due to its strip geometry is rigid in a longitudinal direction.

SUMMARY OF THE INVENTION

A variable-shape aerodynamic area comprises a deformable framework structure that is embedded in a layer made of an elastic material, such as rubber or polymer. In one example, the variable-shape aerodynamic areas includes an improved cover skin. In contrast to known devices, examples of the present invention are adapted to a variable-shape aerodynamic area. A cover skin in the desired direction of deformation may be flexible and/or elastic, and in the directions transverse to it may be rigid. Furthermore, a defined rigidity to bending strain may be selected.

A cover skin is capable of being deformed by flexing and/or stretching in one direction without exhibiting substantial deformation in a transverse direction. A deformable framework structure is embedded in a layer of an elastic material, such as a rubber or a polymer. The framework structure may be comprised of non-deformable elements joined pivotably in auxetic and non-auxetic assemblies of elements that are capable of substantially eliminating transversal contraction, when the cover skin is longitudinal stretched, and substantially eliminating transversal expansion, when the cover skin is longitudinally contracted.

A cover skin for a variable-shape aerodynamic area is capable of being adapted for use in a wing structure, tail unit structure, control surface structure or flap structure. Embodiments of the cover skin comprise a deformable framework ("Fachwerk") structure that is embedded in a layer made of an elastic material such as rubber or polymer. According to one embodiment of the cover skin according to the invention the framework construction comprises elements which are movably interconnected by respective joints. The elements of the framework construction may be interconnected such as an elastic layer. The framework construction, including the elements and the joints, may be made in a single piece from an elastic or flexible material at least in some regions. The single-piece framework construction may be cast from a polymeric material or a metal. Alternatively or in addition, the single-piece framework construction may be made from a fiber-reinforced polymer.

A single-piece framework construction may be cut from a prefabricated plate. The prefabricated plate from which the single-piece framework construction is cut may be made from materials such as metal, polymer or a fiber reinforced polymer. According to one embodiment of the invention, the single-piece framework construction comprises the regions that form the elements and the regions that form the joints, wherein the regions that form the elements are less flexible or elastic than the regions that form the joints.

The elements of the framework construction may be intrinsically elastic. The cross section of the regions that form the joints may be smaller than the cross section of the regions that form the elements. One embodiment of the invention allows for regions that form the elements to be made from a fiber reinforced polymer, and the regions that form the joints to be made from a polymer without fiber reinforcement or with a fiber reinforcement that is weaker such as better flexibility or elasticity is allowed.

In an alternative embodiment of the invention, the framework structure may be attached to an elastic carrier fleece. In this arrangement, the framework structure may attached onto the elastic carrier fleece by methods such as sewing or riveting. An improvement allows for the elastic layer to be an elastically arranged fiber reinforcement, such as milled fibres or from a fleece/nonwoven fabric. According to another embodiment of the invention, the elements may be of elongated cross section in transverse direction and may be embedded on edge in the elastic layer. For example, the cover skin in a first direction may be flexible and/or elastic, and in a second direction, which extends transversely to the first direction, to be rigid.

Another embodiment of the invention allows for the framework structure to comprise auxetic elementary cells that are formed by the elements. In this arrangement, the framework structure may contain auxetic elementary cells formed by the elements, and conventional elementary cells, and comprises a predefined transversal contraction ratio. According to a particular embodiment of the invention, the transversal contraction ratio is zero.

According to one embodiment of the cover skin according to the invention, on two opposite sides in relation to a direction in which the cover skin is flexible and/or elastic, elongated carrier elements that are used for attachment are provided. For example, the carrier elements may be embedded in the elastic layer. The carrier elements may be plate-shaped.

According to one embodiment, the cover skin is installed with initial tension (for example biased) such as bulging during contraction is prevented. Other functional materials, such as carbon black, metal powder or conductive fleece fibers may be admixed to the material that forms the elastic layer. For example, a metallic web or a metallic fleece is embedded in one example of the cover skin. The cover skin may comprise an elastic paint. The cover skin may be temperature-resistant at temperatures greater than 180° C. and at temperatures less than −55° C., if materials are selected that remain operably flexible and/or elastic at such temperatures. In some examples, the materials selected need only accommodate a range of temperature-resistance for a low temperature of at least −55° C. to a high temperature of at least +120° C., depending on the temperatures experienced by the structures during deformation of the cover skin.

BRIEF DESCRIPTION OF THE DRAWINGS

The following drawings are described in more detail in the detailed description.

FIG. 7 (a) depicts a further enlarged sectional view of the cover skin of the variable-shape aerodynamic area that shows the internal structure of the cover skin.

FIG. 7 (b) illustrates a sectional top view of the variable-shape aerodynamic area of FIG. 7a) along the line A-B at a smaller scale.

FIGS. 8 (a) to (c) shows diagrammatic representations corresponding to the top view of FIG. 7b) showing various states of the cover skin, namely a contracted state (FIG. 8a)), a neutral state (FIG. 8b)) and an expanded state (FIG. 8c)).

DETAILED DESCRIPTION OF PREFERRED EMBODIMENTS

Figure 1:
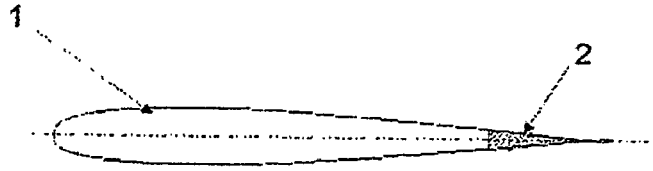
FIG. 1 illustrates a cross-sectional view of an aerodynamic surface with a variable-shape region in the form of a wing structure, tail unit structure, control surface structure or flap structure.
Figure 2:
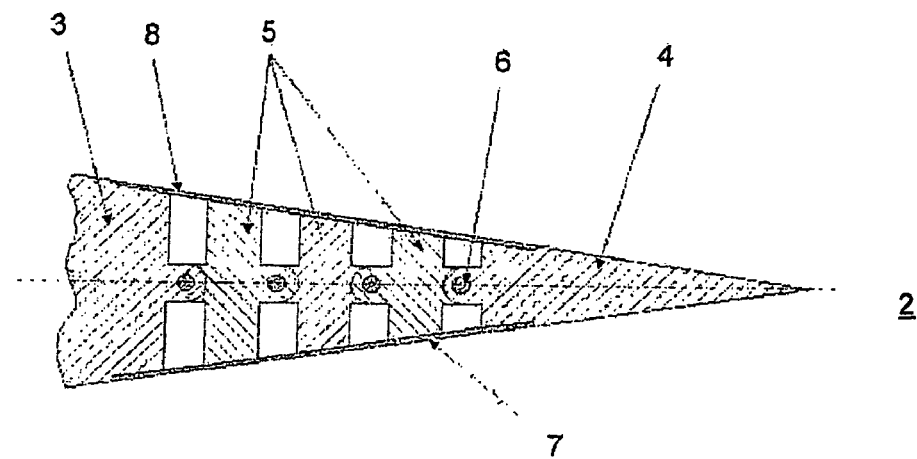
FIGS. 2 to 4 depict enlarged cross-sectional views of the variable-shape region of the aerodynamic area shown in FIG. 1.
Figure 3:
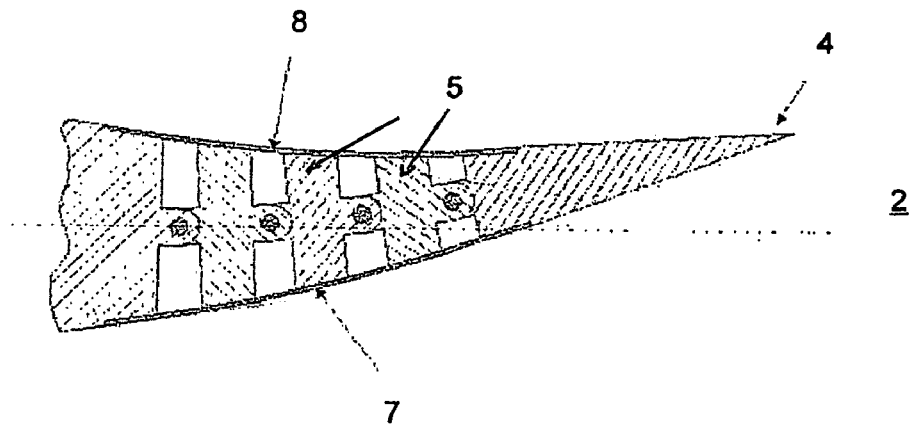
Figure 4:
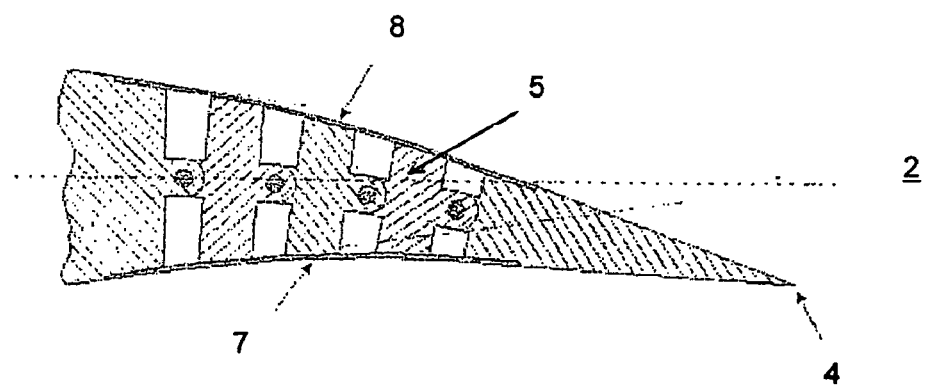

In FIG. 1, a wing cross-section 1 is illustrated, the rear end of the wing cross-section has a variable-shape area 2. Although a wing is shown, the aerodynamic structure may be a wing structure, a tail unit structure, a control surface structure or a flap structure. The variable-shape area 2 may assume various positions, such as the three positions which are shown in FIGS. 2 to 4. FIG. 2 shows the variable-shape area 2 in a neutral position or middle position. FIGS. 3 and 4 show the variable-shape area 2 in two deflected positions, namely in FIG. 3 set to a top position and in FIG. 4 set to a bottom position. In the two cases shown in FIGS. 3 and 4, the variable-shape area 2 has an aerodynamic effect in two directions that are opposite those shown in the position in FIG. 2, such as a control surface or a flap.

The front end of the variable-shape area 2 comprises a rigid box-like wing portion 3 which establishes the connection with a non-variable part of the wing cross-section 1, and a rigid trailing edge 4 which forms the rear end of the variable-shape area 2 and thus also of the wing cross-section. The part of the area 2 that is situated in between is of variable shape.

The inner mechanism of the variable-shape area 2 is not essential in the context of the present invention. In the embodiment shown, a row of profiles 5 that extend in spanwise direction is provided, which are interconnected by means of hinge elements 6 such as they are rotatably articulated.

The gaps formed between the profiles 5 are covered by a bottom elastic skin 7 that is flexible, and a top elastic skin 8 that is flexible. These cover skins 7, 8 form the aerodynamic surface of the wing 1 in the region of the variable-shape area 2. The flexible elastic cover skins 7, 8 are attached not only to the rigid box-like wing portion 3 but also to the rigid trailing edge 4. In between, the cover skins 7, 8 are supported by the profiles 5. If the variable-shape area 2 is deflected upward, as shown in FIG. 3, then the bottom cover skin 7 is elongated while the top cover skin 8 is compressed. In contrast to this, if the variable-shape area 2 is deflected downward, as shown in FIG. 4, the bottom cover skin 7 is compressed while the top cover skin 8 is elongated.

Figure 5:
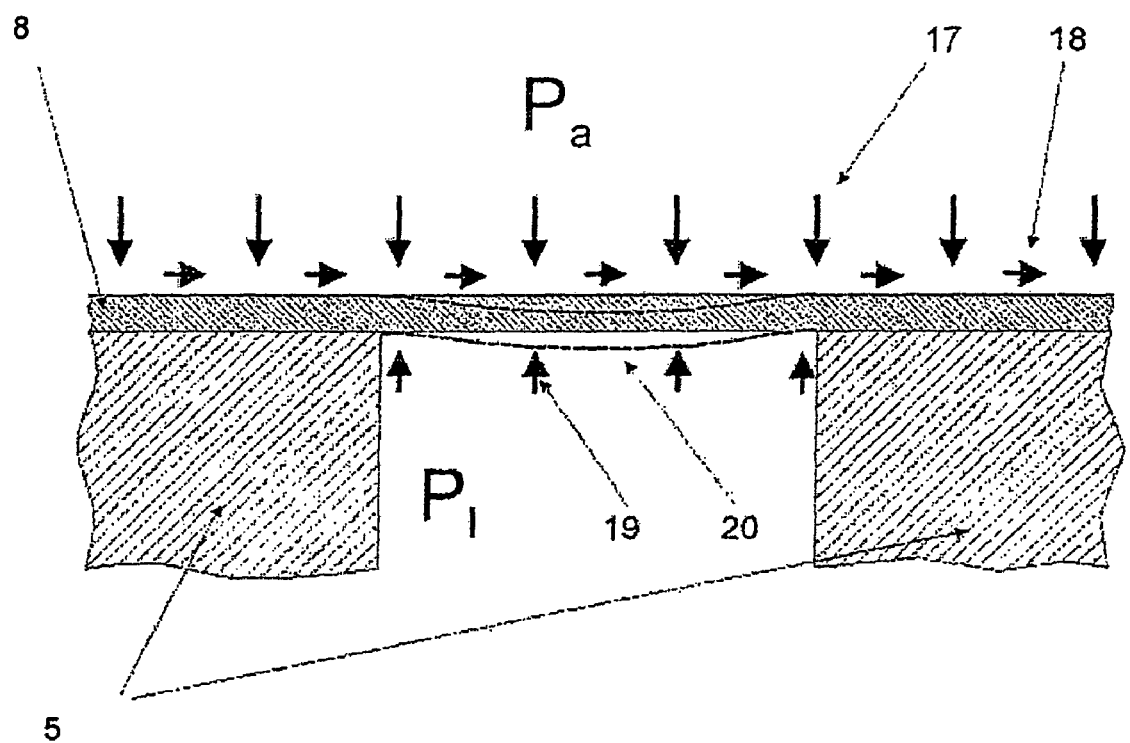
FIGS. 5 and 6 further show an enlarged cross-sectional views showing a section of the cover skin in the variable-shape region of FIGS. 2 to 4.

In FIG. 5, the outer cover skins 7, 8 are subject to aerodynamic loads, which are shown relating to the top elastic skin 8. From the outside, an aerodynamic pressure Pa, and from the inside, a pressure Pi act on the cover skin 8, which results in an outside surface load 17 and an inside surface load 19 on the cover skin 8. The difference between the pressures Pa and Pi results in a force which tends to cause a bulge in the cover skin 8 in one direction or the other, i.e. to the inside or to the outside, wherein FIG. 5 shows the case where the outer pressure Pa exceeds the inner pressure Pi and thus, a force is generated which tends to cause a bulge in the cover skin 8 towards the inside, as shown. Furthermore, due to frictional forces caused by the surrounding flow, a thrust load 18 occurs on the outer surface of the cover skin 8. For aerodynamic reasons, the deformation resulting from the differential pressure on the cover skin 8 should not exceed a predefined permissible magnitude.

The differential pressure results in deformation of the cover skin 8, which deformation for aerodynamic reasons in a concrete application should not exceed a specified permissible magnitude. At the same time, the cover skin 8 should describe a movement of the profiles 5 around their joints 6 or, generally speaking, the cover skin 8 should be in a position to even out any difference in length due to the change in form of the variable-shape area 2 in the form of lengthening or shortening.

Figure 6:
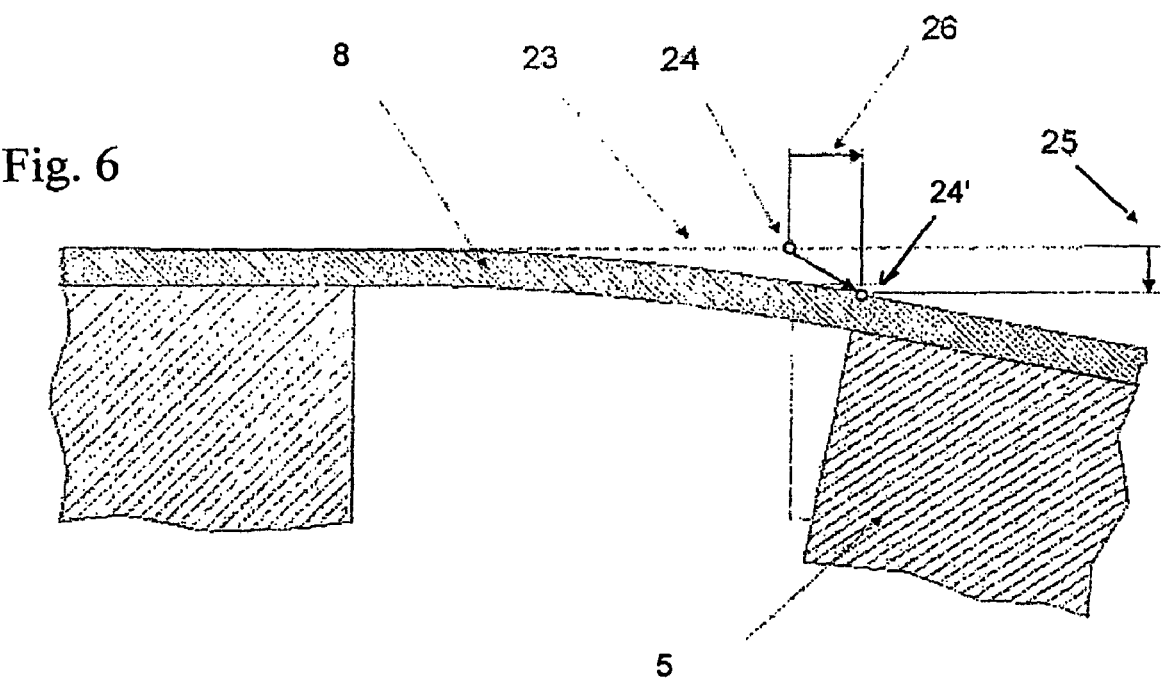

As shown in FIG. 6, the change in shape of the variable-shape surface 2 results in a geometry of the cover skin 8, which is deformed in relation to the initial position 23. A point 24 of the cover skin 8, which is in its initial position 23 and is not deformed, moves to a point 24' as it is displaced by the distance 26 in the direction along the cover skin 8, and by the distance 25 in the direction substantially perpendicular to the cover skin 8. For the point 24 to be able to move to point 24', the cover skin 8 has to be flexible in relation to bending, and elastic in relation to elongating.

With reference to FIGS. 7 and 8, an embodiment of a cover skin, overall designated 8, is to be described, which embodiment of course is not limited to the top cover skin 8 described in FIGS. 2 to 6. Generally speaking the cover skin 8 comprises a deformable framework structure 28 which is embedded in a layer 27 made of an elastic material. This elastic material, which allows for elasticity and flexibility during deformation of the variable-shape aerodynamic area 2, and may be a rubber material or a polymer material.

In the embodiments shown in FIGS. 7a-8c, the framework structure 28 comprises individual elements 29 (one labelled) that are movably interconnected by respective joints 30 (one labelled). As shown in FIG. 7b, the individual elements 29 are of elongated cross section and are embedded on edge in the elastic layer 27. At the two opposing sides with respect to a direction, in which the cover skin 8 is flexible and/or elastic, elongated carrier elements 34, 35 are used to attach the cover skin 8 to the sub-structure, approximately on the rigid box-like wing portion 3 and on the rigid trailing edge 4 or also on the profiles 5. Attachment may take place by connecting structures such as screws 31, as shown in cross section in FIG. 7a. The carrier elements 34, 35 are plate-shaped and embedded in the elastic layer 27, for example.

In the example illustrated in FIGS. 8a-8c, the cover skin 8 is flexible and/or elastic in a first direction depicted by arrows in FIGS. 8a and 8c. In a second direction, which extends transversely to the first direction, the cover skin 8 is rigid. The framework structure 28 is designed from two types of elementary cells 39, 40, which are designed such that a transversal contraction ratio of zero results. In other words, the cover skin 8 does not change in length in the transverse direction, if there is a contraction or expansion in the direction of the arrows, as illustrated in FIGS. 8a and 8c. This is achieved by a combination of so-called auxetic (in German: "auxetisch") elementary cells 39 and conventional elementary cells 40 in the framework construction 28.

The auxetic elementary cells 39 are elements with a negative transverse contraction, while the conventional elementary cells 40 are elements with a positive transverse contraction, such that the respective effects cancel each other out in the transverse direction. The geometry of the auxetic elementary cells 39 is selected such that an expansion in the desired movement direction also leads to an expansion in transverse direction. Contraction in the desired movement direction also leads to contraction in the transverse direction. Beside each auxetic elementary cell 39 a conventional elementary cell 40 is arranged. It contracts in a transverse direction when it is expanded in the desired movement direction. Conversely, the conventional elementary cell 40 expands during contraction in the desired movement direction. Transverse deformation of the auxetic elementary cells 39 and of the conventional elementary cells 40, in each instance is mutually cancelled out so that in effect, the resulting transverse deformation of the framework that would be expected of ordinary material subject to stretching or compression is not exhibited during contraction or expansion in the direction of movement for the cover skin 8.

In order to prevent bulging during contraction, the cover skin 8 may be installed with initial tension. As an alternative, a corresponding high degree of bending rigidity of the framework construction 28 may be provided.

As an alternative to the embodiment shown, in which the elements 29 of the framework construction 28 are interconnected by joints 30, the elements 29 also may be indirectly interconnected using the structure of the elastic layer 27, such that the elements 29 are articulated with regard to one another, as if joined at the joints 30.

According to yet another alternative, the framework construction 28 including the elements 29 and the joints 30, at least in some regions, may include an elastic or flexible material. Thus, the single-piece framework construction 28 contains the regions that form the elements 29, and further contains the regions that form the joints 30, wherein the regions which form the elements 29 may be less flexible or elastic than the regions which form the joints 30. As an alternative, the elements 29 of the framework construction may also be intrinsically elastic.

The cross-section of the region of the single-piece framework construction, which regions form the joints 30, may be smaller than the cross-section of the regions that form the elements 29, or the regions that form the elements 29 may be made from a fiber-reinforced polymer, and the regions that form the joints 30 may be made from a polymer material without fibre reinforcement, or with fibre reinforcement that is correspondingly weaker such that improved flexibility or elasticity may be allowed. In one example, the elements 29 are regions of stiffened material or are a layer of stiffened material.

The framework structure 28 may also be attached to an elastic carrier fleece, wherein the framework structure 28 may be connected to the carrier fleece by attachment methods such as sewing or riveting.

The single-piece framework construction 28 may be cast from materials such as a polymer material or a metal, or it may include a fiber reinforced polymer. For example, the single-piece framework construction 28 may be cut out from a prefabricated plate, such as by laser cutting or water-jet cutting. This prefabricated plate may include metal, polymer or a fiber-reinforced polymer.

The elastic layer 27, in which the framework structure 28 and if applicable the carrier elements 34, 35 are embedded, may comprise an elastic fibre reinforcement, which for example may comprise milled fibres or a fleece, for example.

Furthermore, the material that forms the elastic layer 27 may include additional functional materials which are used to serve additional functions, such as absorption of radar emission and attenuating electromagnetic surface waves, for example. For example, such additional functional materials may be carbon black, metal powder or conductive milled fibres.

Furthermore, a metallic woven fabric or a metallic non-woven fabric 33 may be provided on the cover skin 8 or may be embedded in the cover skin 8, and may serve as protection against lightning. Alternatively, other conductive materials may be coated on the surface of the cover skin 8, such as an elastic paint 32, as depicted in FIG. 7a.

The cover skin 8 is designed such that it resists any temperatures encountered during flight operations. In one example, the materials are selected to be temperature-resistant in a range of temperatures of at least −55° C. for low temperatures and at least +120° C. for high temperatures. More preferably, the materials are selected to increase this range to at least +180° C. for areas experiencing higher temperatures during operation of an aircraft. Even more preferably, in some areas of high speed vehicles or for some high altitude aircraft, materials are selected for even higher or even lower temperatures, respectively.

Thus, a cover skin 8 for a variable-shaped aerodynamic area which is aerodynamically smooth and tight, and which has a light weight and defined flexibility and/or elasticity in a desired direction of movement is provided, while, at the same time, a defined rigidity is provided in at least one other spatial direction.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

LIST OF REFERENCE NUMERALS

1 Wing cross-section
2 Variable-shape area

3 Rigid box-like wing portion
4 Rigid trailing edge
5 Profile
6 Joint
7 Bottom elastic cover skin
8 Top elastic cover skin
17 External pressure
18 Thrust load
19 Internal pressure
20 Bending line of the top elastic cover skin
23 Non-deformed geometry of the top elastic cover skin
24, 24' Point on the surface of the cover skin
25 Vertical deformation of the point 24
27 Elastic rubber layer or polymer layer
28 Framework structure
29 Elements
30 Joints
31 Attachment screws
32 Elastic paint
33 Metallic woven fabric or metallic nonwoven fabric
34, 35 Carrier plate element of the framework structure
38 Contact point between the elements of the framework construction
39 Auxetic elementary cell of the framework construction
40 Conventional elementary cell of the framework construction
50 Substructure

The invention claimed is:

1. A cover skin for a variable-shape aerodynamic area, the cover skin comprising:
a deformable single-piece framework structure embedded in a layer of an elastic material, the framework structure being deformable in a first direction only and comprising:
a plurality of regions that form elements;
a plurality of regions that form joints, the plurality of regions that form elements being pivotably interconnected by respective ones of the plurality of regions that form joints;
auxetic elementary cells being formed by a plurality of the regions that form elements being pivotably interconnected together by the respective ones of the plurality of regions that form joints such that the auxetic elementary cells deform auxetically when compressed and elongated in the first direction of the framework structure; and
non-auxetic elementary cells formed by a plurality of the regions that form elements being pivotably interconnected together by the respective ones of the plurality of regions that form joints such that the non-auxetic elementary cells deform non-auxetically.

2. The cover skin of claim 1, wherein the elements of the framework construction are interconnected such that the elements are articulated by the elastic layer.

3. The cover skin of claim 1, wherein the elastic layer comprises an elastically arranged fiber reinforcement from the group consisting of milled fibers and fibers from a fleece.

4. The cover skin of claim 1, wherein the elements comprise an elongated cross section in a transverse direction and are embedded on edge in the elastic layer.

5. The cover skin of claim 1, wherein the framework structure has a predefined transversal contraction ratio, when the cover skin is extended in the first direction.

6. The cover skin of claim 1, wherein additional functional materials, are admixed to the material that forms the elastic layer and are selected from the group consisting of carbon black, metal powder, and conductive synthetic fibers.

7. The cover skin of claim 1, wherein a metallic woven fabric or a metallic nonwoven fabric is embedded in the cover skin.

8. The cover skin of claim 1, wherein the cover skin comprises an elastic paint.

9. The cover skin of claim 1, wherein the cover skin is temperature-resistant in a range of temperatures from at least −55° C. to at least +180° C.

10. The cover skin of claim 1, wherein the auxetic elementary cells and the non-auxetic elementary cells are selected and arranged alternatingly along a second direction, the second direction being oriented transversely to the first direction.

11. The cover skin of claim 1, wherein the elements and the joints are formed of a single piece of an elastic or flexible material within the cover skin.

12. The cover skin of claim 11, wherein the single-piece framework construction is cast from a polymer material or a metal.

13. The cover skin of claim 11, wherein the single-piece framework construction is made of a fiber reinforced polymer.

14. The cover skin of claim 11, wherein the elements of the framework construction are intrinsically elastic.

15. The cover skin of claim 11, wherein the cross-sectional area of the regions that form the joints is formed to be less than the cross-sectional area of the regions that form the elements, such that the regions that form the elements are formed to be less flexible or elastic than the regions that form the joints.

16. The cover skin of claim 11, wherein the regions that form the elements are formed of a fiber reinforced polymer, and the regions that form the joints are formed of a polymer without any fibre reinforcement or with a fiber reinforcement less rigid than the fiber reinforced polymer forming the elements, such that the regions that form the elements are formed to be less flexible or elastic than the regions that form the joints.

17. The cover skin of claim 11, wherein the single-piece framework construction is machined from a prefabricated plate.

18. The cover skin of claim 17 wherein the prefabricated plate from which the single-piece framework construction is of a material selected from the group of materials consisting of a metal, a polymer, a fiber reinforced polymer and combinations thereof.

19. The cover skin of claim 1, wherein the framework structure is attached to an elastic carrier fleece.

20. The cover skin of claim 19, wherein the framework structure is attached onto the elastic carrier fleece by attachment methods such as sewing or riveting.

21. The cover skin of claim 1, further comprising elongated carrier elements for attaching the cover skin to the variable-shaped aerodynamic area, wherein the elongated carrier elements are disposed on each of two opposite sides of the cover skin, such that the cover skin is capable of deforming in a direction transverse to the two opposite sides.

22. The cover skin of claim 21, wherein the carrier elements are plate-shaped.

23. The cover skin of claim 21, wherein the cover skin is fitted to a variable-shaped aerodynamic area selected from the group of areas consisting of a wing structure, a tail unit structure, a control surface structure and a flap structure.

24. The cover skin of claim 23, wherein the cover skin is fitted with an initial tension, such that bulging during contraction of the cover skin is prevented.

25. A cover skin for a variable-shape aerodynamic area, the cover skin comprising:

a deformable single-piece framework structure embedded in a layer of an elastic material, the framework structure being deformable in a first direction and comprising:

a plurality of regions that form elements;

a plurality of regions that form joints, the plurality of regions that form elements being pivotably interconnected by respective ones of the plurality of regions that form joints;

auxetic elementary cells being formed by a plurality of the regions that form elements being pivotably interconnected together by the respective ones of the plurality of regions that form joints such that the auxetic elementary cells deform auxetically when compressed and elongated in the first direction of the framework structure; and non-auxetic elementary cells formed by a plurality of the regions that form elements being pivotably interconnected together by the respective ones of the plurality of regions that form joints such that the non-auxetic elementary cells deform non-auxetically wherein the cover skin is deformable in the first direction, and the cover skin does not substantially deform in a second direction transverse to the first direction, when the cover skin is substantially deformed in the first direction.

26. A cover skin for a variable-shape aerodynamic area, the cover skin comprising:

a deformable single-piece framework structure embedded in a layer of an elastic material, the framework structure being deformable in a first direction and comprising:

a plurality of regions that form elements;

a plurality of regions that form joints, the plurality of regions that form elements being pivotably interconnected by respective ones of the plurality of regions that form joints;

auxetic elementary cells being formed by a plurality of the regions that form elements being pivotably interconnected together by the respective ones of the plurality of regions that form joints such that the auxetic elementary cells deform auxetically when compressed and elongated in the first direction of the framework structure; and non-auxetic elementary cells formed by a plurality of the regions that form elements being pivotably interconnected together by the respective ones of the plurality of regions that form joints such that the non-auxetic elementary cells deform non-auxetically; wherein the framework structure has a predefined transversal contraction ratio, when the cover skin is extended in the first direction; wherein the auxetic elementary cells and the non-auxetic elementary cells are selected and arranged such that transversal contraction ratio is zero.

* * * * *